United States Patent
Fukazawa et al.

(10) Patent No.: US 6,807,271 B1
(45) Date of Patent: Oct. 19, 2004

(54) EXCHANGE AND TELEPHONE EXCHANGE SYSTEM

(75) Inventors: Shigeru Fukazawa, Hino (JP); Satoshi Nishiyama, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/372,677

(22) Filed: Aug. 12, 1999

(30) Foreign Application Priority Data

Aug. 14, 1998 (JP) .......................................... 10-229666

(51) Int. Cl.[7] .............................................. H04M 7/00
(52) U.S. Cl. .................. 379/229; 379/221.08; 379/230
(58) Field of Search ....................... 379/212.01, 221.08, 379/221.09, 221.12, 229, 230, 221.13

(56) References Cited

U.S. PATENT DOCUMENTS

| | | | | |
|---|---|---|---|---|
| 4,757,267 A | * | 7/1988 | Riskin ................... | 379/114.24 |
| 5,432,931 A | | 7/1995 | Woess et al. ............... | 395/650 |
| 5,461,669 A | | 10/1995 | Vilain ......................... | 379/350 |
| 5,548,640 A | | 8/1996 | Blondel et al. ............. | 379/242 |
| 5,572,583 A | * | 11/1996 | Wheeler, Jr. et al. ... | 379/221.09 |
| 5,598,464 A | * | 1/1997 | Hess et al. ............. | 379/211.03 |
| 5,661,792 A | * | 8/1997 | Akinpelu et al. ...... | 379/221.13 |
| 5,717,748 A | * | 2/1998 | Sneed, Jr. et al. ...... | 379/221.09 |
| 5,717,749 A | * | 2/1998 | Sneed, Jr. et al. ...... | 379/221.09 |
| 5,937,051 A | * | 8/1999 | Hurd et al. ............ | 379/212.01 |
| 6,064,729 A | * | 5/2000 | Cookson ..................... | 379/230 |

FOREIGN PATENT DOCUMENTS

EP 0 576 141 A2 12/1993

* cited by examiner

Primary Examiner—Bing Q. Bui
(74) Attorney, Agent, or Firm—Finnegan, Henderson, Farabow, Garrett & Dunner, L.L.P.

(57) ABSTRACT

A service is provided not only by an internally preset fixed function but also by an externally provided function which can be altered by a user side. An exchange apparatus provided with a service process section for providing a service associated with a control signal comprises a process location determination section for determining a location of execution of a process associated with the control signal, a control signal notice section for issuing a notice on the control signal to the outside when the determination section has determined that the process is to be executed outside, a data storage section for storing data to be used when the process is executed, a data interface section for reference of data stored in the data storage section in accordance with a request arising from the externally executed service process, and service providing section for providing services based on a result of the externally executed process.

37 Claims, 6 Drawing Sheets

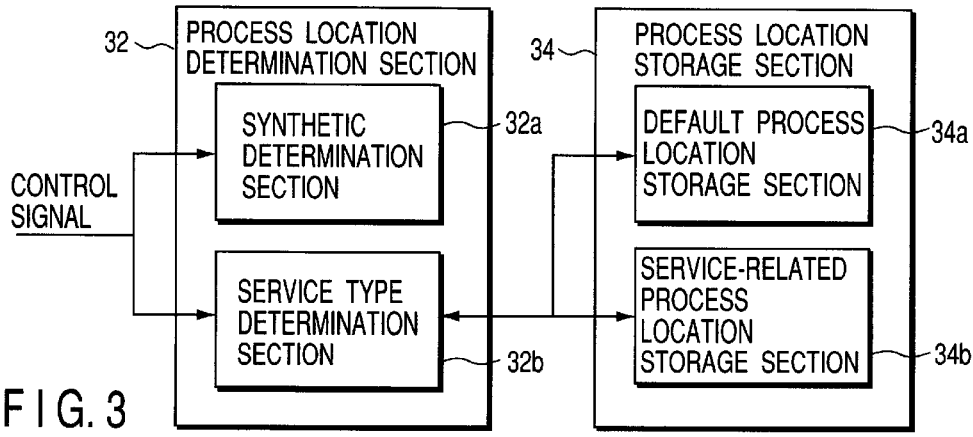
FIG. 3
34b SERVICE-RELATED PROCESS LOCATION STORAGE SECTION
| SERVICE | PROCESS LOCATION |
|---|---|
| TRANSFER | INSIDE |
| PICK-UP | INSIDE |
| MESSAGE WAITING | OUTSIDE |
| | |
FIG. 4
34c ARRIVAL-TIME-RELATED PROCESS LOCATION STORAGE SECTION
| TIME ZONE | PROCESS LOCATION |
|---|---|
| 0:00 ~ 8:00 | OUTSIDE |
| 8:00 ~ 17:00 | INSIDE |
| 17:00 ~ 0:00 | OUTSIDE |
FIG. 6
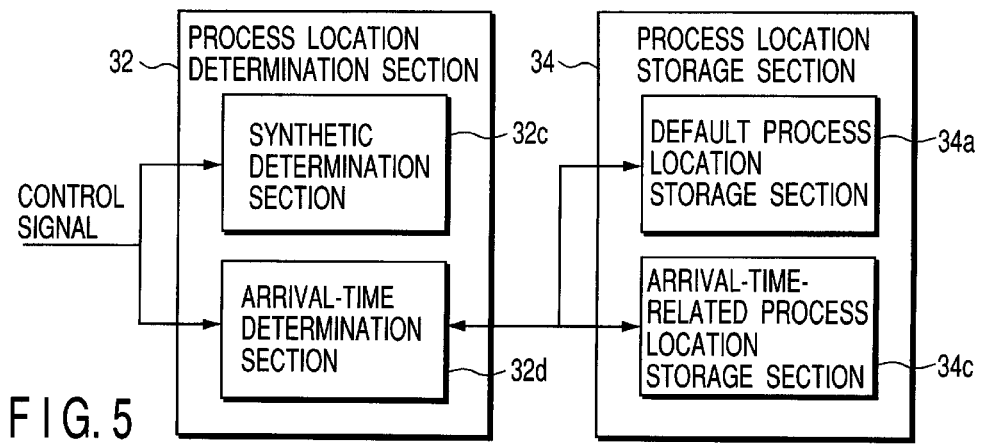
FIG. 5

SIGNAL FLOW AMONG TELEPHONE, EXCHANGE AND COMPUTER

| FLAG | NOTICE CONTENT DATA |

FIG. 8  INTERNAL SIGNAL FRAME

53a PORT NO. TABLE

| PORT NO. | PROCESS LOCATION |
|---|---|
| 000 | OUTSIDE |
| 001 | INSIDE |
| 002 | INSIDE |
| 003 | OUTSIDE |
| ⋮ | ⋮ |

FIG. 9

53a TERMINAL ATTRIBUTE TABLE

| TERMINAL ATTRIBUTE |
|---|
| OUTSIDE LINE CALL ENABLED |
| ⋮ |
| EXTENSION GROUP A |
| ⋮ |

FIG. 10A

53a GROUP TABLE

| GROUP | PROCESS LOCATION |
|---|---|
| EXTENSION GROUP A | OUTSIDE |
| EXTENSION GROUP B | INSIDE |
| PICK-UP GROUP 1 | INSIDE |
| ⋮ | ⋮ |

FIG. 10B

EXCHANGE AND TELEPHONE EXCHANGE SYSTEM

BACKGROUND OF THE INVENTION

The present invention relates to an exchange accommodating a communication line of a public network or a private exchange network, and to a telephone system exchange for interconnecting an exchange and a computer to perform telephone exchange.

In a conventional exchange accommodating a communication line of a public network or a private exchange network, operational instructions or responses are delivered to the communication line by fixed processing according to control signals sent from the communication line. Specifically, in the exchange, exchange process programs for realizing processes corresponding to control signals are fixedly stored in a built-in storage medium such as a ROM or a hard disk. By executing the exchange process programs, service determination/instruction functions (execution of service processes) associated with the control signals are achieved.

Once the exchange has been delivered to the user, processing in the exchange cannot easily be modified to meet requests on the user side.

As has been described above, since the exchange process programs are fixedly incorporated in the conventional exchange at the time of delivery, the requests on the user side cannot easily be met.

BRIEF SUMMARY OF THE INVENTION

The present invention has been made in consideration of the above circumstances, and the object of the invention is to provide an exchange and a telephone exchange system capable of providing services by external functions which can be modified on the user side.

In order to achieve the object, according to an aspect of the invention, there is provided an exchange apparatus for providing a service relating to telephone exchange in accordance with a control signal received from a communication line, the exchange apparatus comprising: control signal receiving means for receiving the control signal from the communication line; process location determination means for determining whether a process associated with the control signal received by the control signal receiving means is to be executed within the exchange apparatus or in a processing apparatus external to the exchange apparatus; control signal notice means for notifying the processing apparatus external to the exchange apparatus of a content of the received control signal, when the process location determination means has determined that the process is to be executed in the external processing apparatus; and service providing means for providing a service, on the basis of a result of the process executed by the external processing apparatus in accordance with the content of the control signal, of which the external processing apparatus was notified by the control signal notice means.

The exchange apparatus according to the invention may further comprise data storage means for storing various data to be used when the process associated with the received control signal is executed.

The exchange apparatus according to the invention may further comprises data interface means for outputting the data stored in the data storage means to the processing apparatus external to the exchange apparatus, in accordance with a request arising from the process, of which the external processing apparatus was notified by the control signal notice means and which was executed by the external processing apparatus in accordance with the content of the control signal.

If the data interface means is provided, the external processing apparatus can process the control signal by using the data in the telephone exchange.

It is preferable that the service providing means include instruction transmission means for transmitting an instruction to the communication line or another communication line.

With this structure, the operational instruction can be sent to the communication line, through which the control signal was sent, or another communication line, on the basis of the process executed by the exchange apparatus or the external processing apparatus in response to the control signal from the communication line.

The exchange apparatus according to the invention may further comprise process location storage means for storing information as to whether the process associated with the received control signal is to be executed within the exchange apparatus or in the external processing apparatus, wherein the process location determination means effects the determination on the basis of the information stored in the process location storage means.

The exchange apparatus according to the invention should preferably further comprise process location rewrite means for rewriting the information stored in the process location storage means.

If the data interface means is provided, the external processing apparatus can process the control signal by using the data in the telephone exchange.

The process location storage means may include service-related process location storage means for storing data on a location of execution of the process associated with the control signal in accordance with a type of service, and the process location determination means may include service type determination means for determining the service type corresponding to the received control signal and acquires data on the location of execution from the service-related process location storage means on the basis of the service type corresponding to the received control signal.

With this structure, the process location can be altered according to the service type. For example, when higher-level processes or higher-speed processes are to be executed, they can be executed by the external processing apparatus.

The process location storage means may include arrival-time-related process location storage means for storing data on a location of execution of the process associated with the control signal in accordance with a time zone, and the process location determination means may include control-signal arrival time determination means for determining an arrival time of the received control signal and acquires data on the location of execution from the arrival-time-related process location storage means on the basis of the arrival time of the received control signal.

With this structure the process location can be altered according to the time zone. For example, in a time zone in which exchange functions of the exchange apparatus are frequently performed, the control signal may be processed by the external processing apparatus, thus keeping smooth exchange functions.

The exchange apparatus according to the invention may further comprise internal signal frame preparation means for preparing an internal signal frame on the basis of the control signal sent from the communication line, wherein the internal signal frame includes a flag indicative of a location of execution of the process associated with the control signal and information indicative of the content of the control signal, and the process location determination means determines the location of execution of the process associated with the control signal on the basis of the flag.

The internal signal frame preparation means may set the flag indicating that the process associated with the control signal is to be executed in the processing apparatus external to the exchange apparatus, when the control signal, in which a specific number indicating the execution of the process in the external processing apparatus is designated, has been input.

With this structure, if the user dials the specific number, the external processing apparatus is caused to perform the process corresponding to the control signal.

The internal signal frame preparation means may set the flag indicating that the process associated with the control signal is to be executed in the processing apparatus external to the exchange apparatus, when a port connected to the communication line through which the control signal has been sent is a special one.

With this structure, the control signal received through the special port can always be processed by the external processing apparatus.

The internal signal frame preparation means may set the flag indicating that the process associated with the control signal is to be executed in the processing apparatus external to the exchange apparatus, when the communication line through which the control signal has been sent belongs to a specific group.

With this structure, the control signal from the telephone belonging to the specific group can always be processed by the external processing apparatus.

The exchange apparatus according to the invention should preferably further comprise process location storage means for storing information as to whether the process associated with the received control signal is to be executed within the exchange apparatus or in the external processing apparatus, and internal signal frame preparation means for preparing an internal signal frame on the basis of the control signal sent from the communication line, wherein the internal signal frame includes a flag indicative of a location of execution of the process associated with the control signal and information indicative of the content of the control signal, and the process location determination means effects the determination on the basis of the information stored in the process location storage means and the flag.

With this structure, the process location can be determined on the basis of the information stored in the process location storage means and the flag.

It is preferable that the process location determination means determines the location of execution of the process on the basis of determination based on the information stored in the process location storage means, determination based on the flag, and a predetermined order of priority of determination.

With this structure, the process location can be determined even if the determination based on the information stored in the process location storage means differs from the determination based on the flag.

The predetermined order of priority of determination may be defined to give a priority to the determination based on the information stored in the process location storage means, or to the determination based on the flag, or to the execution of the process by the external processing apparatus.

It is preferable that the instruction transmission means transmits an instruction to the communication line or another communication line, with use of the same instruction as in the case where the process is executed within the exchange apparatus, on the basis of a result of the process executed by the processing apparatus external to the exchange apparatus.

Even where the process is executed by the external processing apparatus, if the instruction is sent to the communication line or another communication line with use of the same instruction as in the case where the process is internally executed, the process is executed as if it were executed within the exchange apparatus. Thereby, the control signal can be processed by the external processing apparatus, without making no modification to the telephone, etc. connected to the communication line, and the process result can be returned to the communication line.

It is preferable that the exchange apparatus further comprise second service providing means for providing a service on the basis of a result of the process executed in accordance with the content of the control signal, where the process location determination means has determined that the process is to be executed within the exchange apparatus.

According to another aspect of the invention, there is provided a telephone exchange system comprising a telephone exchange apparatus for performing an operation relating to telephone exchange in accordance with a control signal received from a communication line, and an external processing apparatus for performing a process associated with the control signal from the communication line, of which the telephone exchange apparatus notifies the external processing apparatus, the telephone exchange apparatus comprising: control signal receiving means for receiving the control signal from the communication line; process location determination means for determining whether the process associated with the control signal received by the control signal receiving means is to be executed in the external processing apparatus; control signal notice means for notifying the external processing apparatus of a content of the received control signal, when the process location determination means has determined that the process is to be executed in the external processing apparatus; and means for performing the operation relating to the telephone exchange, on the basis of a result of the process executed by the external processing apparatus in accordance with the content of the control signal, of which the external processing apparatus was notified by the control signal notice means, and the external processing apparatus comprising: external service process means for performing the process based on the content of the control signal, of which the external service process means has been notified by the control signal notice means.

It is preferable that the telephone exchange system further comprise data storage means for storing various data to be used when the process associated with the received control signal is executed.

It is preferable that the external service process means include data request means for requesting necessary data for the process based on the content of the control signal from the telephone exchange apparatus, and that the telephone exchange apparatus further comprise data interface means for outputting to the data request means the data stored in the data storage means in response to a request by the data request means.

If the data interface means is provided, the external processing apparatus can process the control signal by using the data in the telephone exchange.

The telephone exchange apparatus may further include process location storage means for storing information as to whether the process associated with the received control signal is to be executed within the telephone exchange apparatus or in the external processing apparatus, and process location rewrite means for rewriting the information stored in the process location storage means, and the external service process means may include process location rewrite instruct means for instructing the process location rewrite means to rewrite data on the process location.

If the process location rewrite means is provided, the process location can be rewritten, depending on the situation, and more flexible services can be provided.

According to still another aspect of the invention, there is provided a telephone exchange system comprising a telephone exchange apparatus for performing an operation relating to telephone exchange in accordance with a control signal received from a communication line, and an external processing apparatus for performing a process associated with the control signal, the system comprising: control signal receiving means for receiving the control signal from the communication line; process location determination means for determining whether the process associated with the control signal received by the control signal receiving means is to be executed within the exchange apparatus or in the external processing apparatus; process execution means, provided in the external processing apparatus, for executing the process in accordance with the control signal, when the process location determination means has determined that the process is to be executed by the external processing apparatus; and operation means, provided in the exchange apparatus, for performing the operation relating to the telephone exchange on the basis of a result of the process executed by the process execution means.

According to still another aspect of the invention, there is provided a telephone exchange system comprising a telephone exchange apparatus for performing an operation relating to telephone exchange in accordance with a control signal received from a communication line, and an external processing apparatus for performing a process associated with the control signal, the system comprising: control signal receiving means for receiving the control signal from the communication line; process location determination means for determining whether the process associated with the control signal received by the control signal receiving means is to be executed within the exchange apparatus or in the external processing apparatus; process execution means, provided in the exchange apparatus, for executing the process in accordance with the control signal, when the process location determination means has determined that the process is to be executed within the exchange apparatus; and operation means, provided in the exchange apparatus, for performing the operation relating to the telephone exchange on the basis of a result of the process executed by the process execution means.

According to still another aspect of the invention, there is provided a telephone exchange system comprising a telephone exchange apparatus for performing an operation relating to telephone exchange in accordance with a control signal received from a communication line, and an external processing apparatus for performing a process associated with the control signal, the system comprising: control signal receiving means for receiving the control signal from the communication line; determination means for determining whether the process associated with the control signal received by the control signal receiving means is to be executed in the external processing apparatus; process execution means, provided in the external processing apparatus, for executing the process in accordance with the control signal, when the determination means has determined that the process is to be executed by the external processing apparatus; and operation means, provided in the exchange apparatus, for performing the operation relating to the telephone exchange on the basis of a result of the process executed by the process execution means.

According to still another aspect of the invention, there is provided an exchange apparatus for use in a telephone exchange system comprising an exchange apparatus for performing an operation relating to telephone exchange in accordance with a control signal received from a communication line, and an external processing apparatus including process execution means for performing a process associated with the control signal, the exchange apparatus comprising: control signal receiving means for receiving the control signal from the communication line; process location determination means for determining whether the process associated with the control signal received by the control signal receiving means is to be executed within the exchange apparatus or in the external processing apparatus; and operation means for performing the operation relating to the telephone exchange on the basis of a result of the process executed by the process execution means.

According to still another aspect of the invention, there is provided an exchange apparatus for use in a telephone exchange system comprising an exchange apparatus for performing an operation relating to telephone exchange in accordance with a control signal received from a communication line, and an external processing apparatus for performing a process associated with the control signal, the exchange apparatus comprising: control signal receiving means for receiving the control signal from the communication line; process location determination means for determining whether the process associated with the control signal received by the control signal receiving means is to be executed within the exchange apparatus or in the external processing apparatus; process execution means for executing the process in accordance with the control signal, when the process location determination means has determined that the process is to be executed within the exchange apparatus; and operation means for performing the operation relating to the telephone exchange on the basis of a result of the process executed by the process execution means.

According to still another aspect of the invention, there is provided an exchange apparatus for use in a telephone exchange system comprising an exchange apparatus for performing an operation relating to telephone exchange in accordance with a control signal received from a communication line, and an external processing apparatus including process execution means for performing a process associated with the control signal, the exchange apparatus comprising: control signal receiving means for receiving the control signal from the communication line; process location determination means for determining whether the process associated with the control signal received by the control signal receiving means is to be executed in the external processing apparatus; and operation means for performing the operation relating to the telephone exchange on the basis of a result of the process executed by the process execution means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing a structure of a process location determination section 32 according to a first structure;

FIG. 4 shows an example of information stored in a service-related process location storage section 34b;

FIG. 5 is a block diagram showing a structure of the process location determination section 32 according to a second structure;

FIG. 6 shows an example of information stored in a arrival time-related process location storage section 34c;

FIG. 8 shows an example of a format of an internal signal frame generated by an internal signal frame preparation section 52;

FIG. 9 shows an example of a port number table 53a stored in a control signal determination information storage section 53;

FIGS. 10A and 10B show examples of a terminal attribute table 53b and a group table 53c stored in the control signal determination information storage section 53.

DETAILED DESCRIPTION OF THE INVENTION

Figure 1:
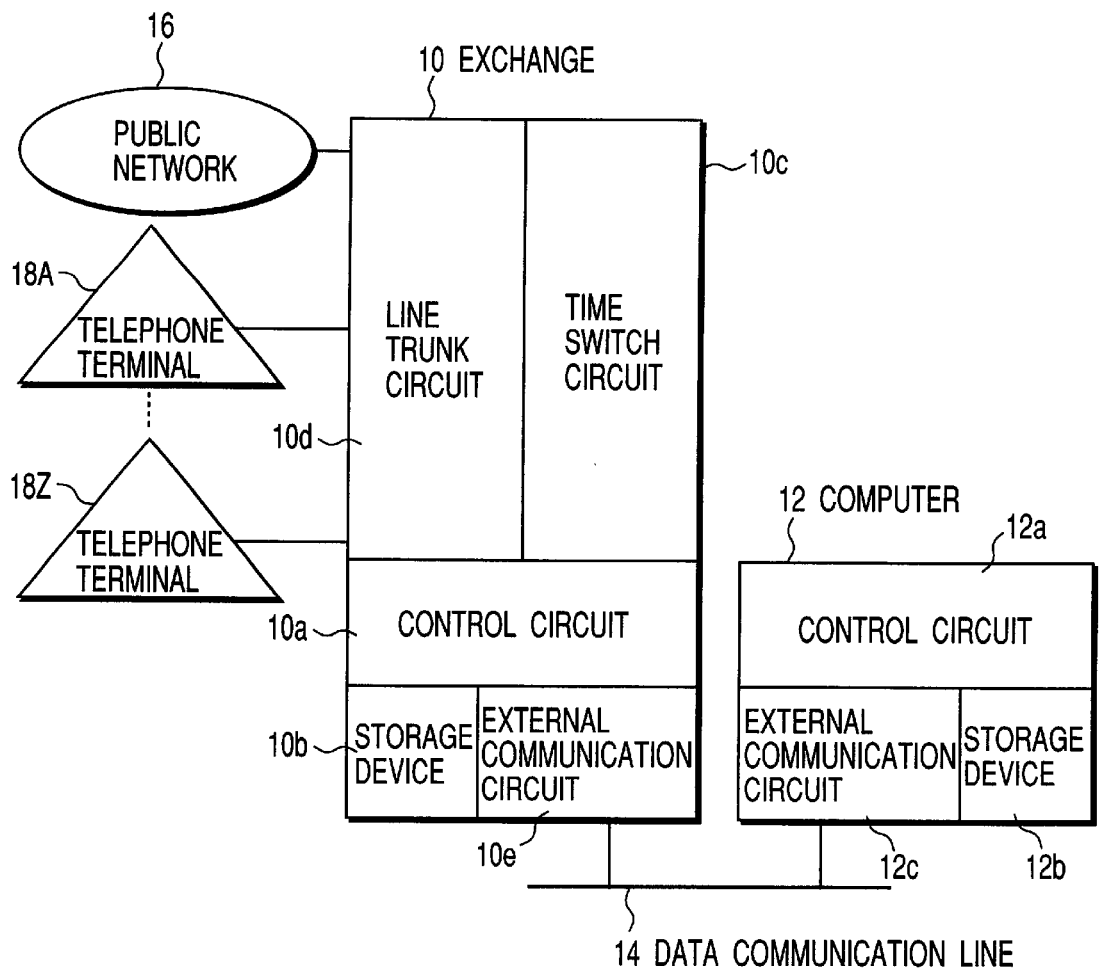
FIG. 1 is a block diagram showing a schematic structure of a telephone exchange system according to an embodiment of the present invention.

An embodiment of the present invention will now be described with reference to the accompanying drawings. FIG. 1 is a block diagram showing a schematic structure of a telephone exchange system according to the embodiment of the invention.

As is shown in FIG. 1, the telephone exchange system according to the embodiment comprises an exchange 10 connected to communication lines such as a public line, a dedicated line and an extension telephone line, and an external computer (external processing apparatus) 12 connected to the exchange 10 over a data communication line 14 of, e.g. a local area network.

The exchange 10 is connected to various communication lines and executes a predetermined process associated with a control signal sent from the communication line. The exchange 10 comprises a control circuit 10a, a storage device 10b, a time switch circuit 10c, a various-line trunk circuit 10d and an external communication circuit 10e.

The control circuit 10a performs an entire control for operating the exchange 10. The control circuit 10a causes its internal CPU to execute exchange process programs stored in the storage device 10b, thereby to realize various functions.

The storage device 10b stores various information for controlling the operation of the control circuit 10a. The information stored in the storage device 10b includes various programs such as exchange process programs and various data.

The time switch circuit 10c connects, under the control of the control circuit 10a, communication paths of the communication lines accommodated in the various-line trunk circuit 10d. In the time switch circuit 10c, the communication lines are freely exchanged and connected by interchanging time slots.

The various-line trunk circuit 10d is an interface for accommodating various communication lines such as an office line (public network 16) and an extension line (telephone terminal), and controlling the conversion of signals, the monitoring of state and the sending of signals.

The external communication circuit 10e performs a control for communication with the external computer 12 over the communication line 14 of, e.g. a local area network (LAN).

The computer 12 is used to execute, in lieu of the exchange 10, a process associated with a control signal received from the communication line. The computer 12 comprises a control circuit 12a, a storage device 12b and an external communication circuit 12c.

The control circuit 12a performs an entire control for operating the computer 12. The control circuit 12a realizes various functions by executing various programs including exchange process programs.

The storage device 12b stores various information for controlling the operation of the control circuit 12a. Such information includes programs such as exchange process programs and data.

The external communication circuit 12c performs a control for communication with the exchange 10 over the communication line 14 of, e.g. a local area network (LAN).

Figure 2:
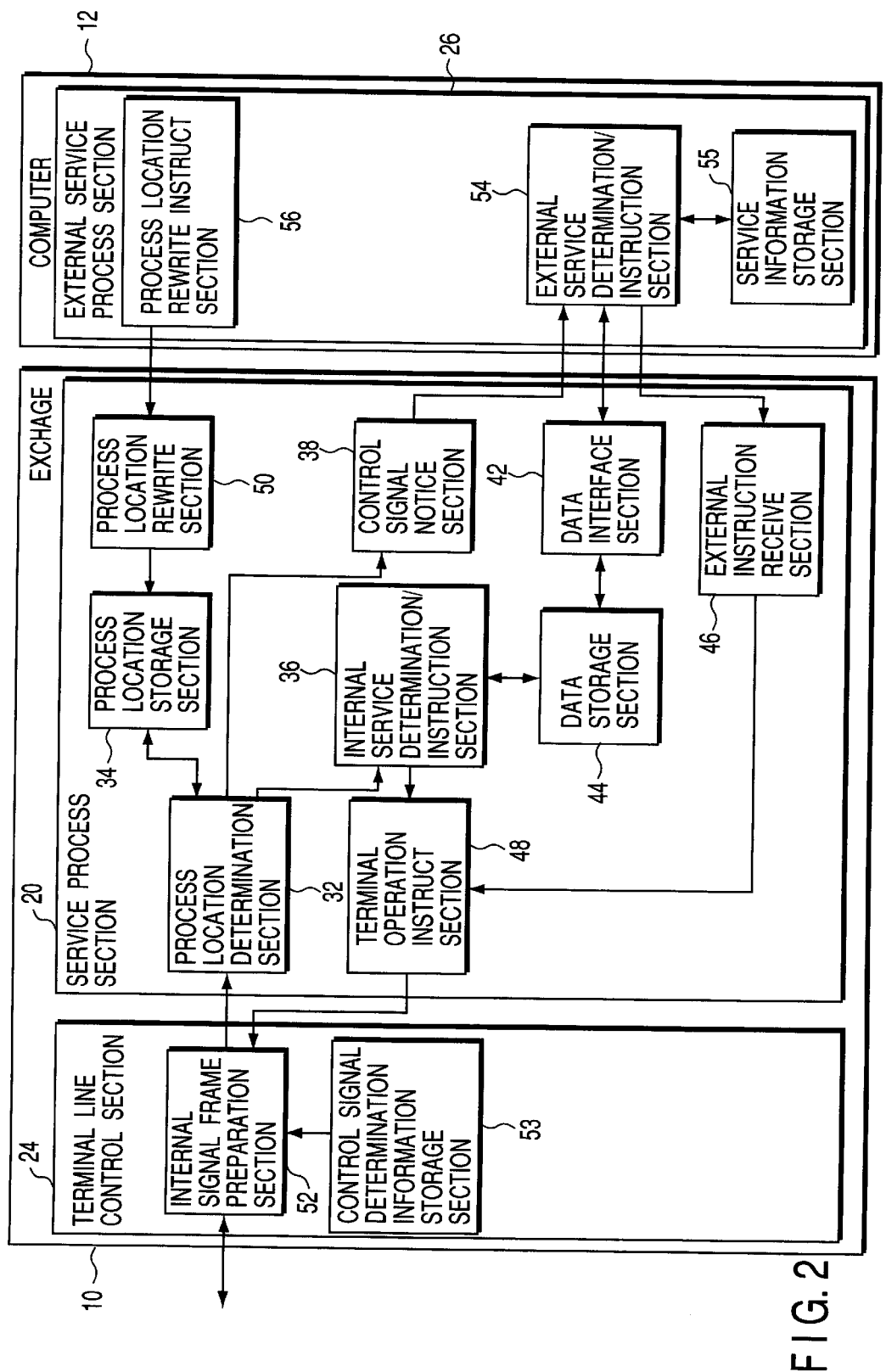
FIG. 2 is a block diagram showing a functional configuration realized by the system structure of FIG. 1.

FIG. 2 is a block diagram showing a functional configuration of the telephone exchange system realized by the system structure of FIG. 1. As is shown in FIG. 2, the exchange 10 is provided with functions of a service process section 20 and a terminal line control section 24. The computer (external processing apparatus) 12 is provided with a function of an external service processing section 26.

The service process section 20 and terminal line control section 24 are realized when the CPU of the control circuit 10a has executed the programs stored in the storage device 10b.

The service process section 20 performs functions relating to telephone exchange in accordance with control signals sent from the communication line. The control signals received by the service process section 20 include an off-hook signal, a dial signal and an on-hook signal, and services include call hold, transfer, camp-on, etc.

The service process section 20 is provided with functions of a process location determination section 32, a process location storage section 34, an internal service determination/instruction section 36, a control signal notice section 38, a data interface section 42, a data storage section 44, an external instruction receive section 46, a terminal operation instruct section 48, and a process location rewrite section 50.

The process location determination section 32 determines whether a process, which is associated with a control signal input from the communication line through the terminal line control section 24, should be executed by the internal service determination/instruction section 36 pre-provided in the exchange 10 or by an external service determination/instruction section 54 provided in the computer (external processing means) 12. A detailed structure of the process location determination section 32 will be described later with reference to FIGS. 3 and 5.

The process location storage section 34 stores information indicating whether the control signal sent from the communication line should be processed by the internal service determination/instruction section 36 in the exchange 10 or by the external service determination/instruction section 54 in the computer 12.

The internal service determination/instruction section 36 is realized by causing the control circuit 10a to execute the exchange process program preset in the storage device 10b in the exchange 10. The internal service determination/instruction section 36 executes a process associated with a control signal sent from the communication line, when the process location determination section 32 has determined that a service corresponding to the control signal should be carried out in the exchange.

The control signal notice section 38 notifies the external service determination/instruction section 54 of external computer 12 of the content of an input control signal from the communication line, when the process location determination section 32 has determined that a service corresponding to the control signal should be carried out in a processing apparatus external to the exchange.

The data interface section 42 outputs data stored in the data storage section 44 in the exchange 10 to the external service determination/instruction section 54 in response to a request from the external service determination/instruction section 54, when a service associated with a control signal from the communication line is executed by the external service determination/instruction section 54 in the computer 12. The data interface section 42 also rewrites data in the data storage section 44 on the basis of data from the external service determination/instruction section 54.

The data storage section 44 stores various data to be used when service processes associated with various control signals are executed. The data storage section 44 is referred to by the internal service determination/instruction section 36 or by the external service determination/instruction section 54 via the data interface section 42.

The external instruction receive section 46 receives a result executed by the external service determination/instruction section 54 in computer 12. Based on the content of the result, the external instruction receive section 46 outputs an instruction to the communication line via the terminal operation instruct section 48, using the same instruction as that used in the processing by the internal service determination/instruction section 36.

The terminal operation instruct section 48 transmits, to the communication line via the terminal line control section 24, an instruction based on the processing result by the internal service determination/instruction section 36, and an instruction based on the processing result by the external service determination/instruction section 54 which is received by the external instruction receive section 46.

With use of a process location rewrite instruct section 56 or a maintenance console (not shown) in the exchange 10, the process location rewrite section 50 can rewrites the content of information stored in the process location storage section 34, which indicates the location where the process associated with the input control signal is to be executed.

A method of rewriting by the process location rewrite instruct section 56 will now be specifically described.

If a rewrite command is input by the user through a keyboard (not shown) of the computer 12, the computer 12 is set in a rewrite mode and prompts the user to input information for specifying a service and a process location of the service by means of a screen on a display (not shown). If the user then inputs the information specifying the service and its process location, the process location rewrite instruct section 56 causes the process location rewrite section 50 of exchange 10 to rewrite the content of information indicative of the location of execution associated with each control signal, which is stored in the process location storage section 34.

The terminal line control section 24 controls the communication line connected to the system, and comprises an internal signal frame preparation section 52 and a control signal determination information storage section 53.

The internal signal frame preparation section 52 generates an internal signal frame in response to a control signal sent from the communication line and notifies the process location determination section 32 of service process section 20 of the control signal. In accordance with the input control signal, the internal signal frame preparation section 52 adds to the internal signal frame a predetermined mark indicating whether a process associated with the control signal should be performed internally (in the internal service determination/instruction section 36) or externally (in the external service determination/instruction section 54), and outputs the resultant internal signal frame, thereby causing the process location determination section 32 to determine the process location. For example, where a specific number indicating that a service is to be processed by the computer 12 has been input by the user, or where the port connected to the communication line through which the control signal has been sent is a special port, or where the communication line through which the control signal has been sent belongs to a specific group, a flag indicating the external processing apparatus is added to the internal signal frame and the resultant internal signal frame is output. Thereby, the internal signal frame preparation section 52 issues a notice to the effect that the service process associated with the control signal is to be executed in the processing apparatus external to the exchange.

The control signal determination information storage section 53 is referred to, when the internal signal frame preparation section 52 generates the internal signal frame. The storage section 53 stores information for determining the process location of the input control signal.

On the other hand, the external service processing section 26 of computer 12 comprises external service determination/instruction section 54, service information storage section 55 and process location rewrite instruct section 56.

The external service determination/instruction section 54 is realized by causing the control circuit 12a to execute the exchange process program preset in the storage device 12b of computer 12. When the process location determination section 32 has determined that the service associated with the control signal sent from the communication line is to be executed by the external processing apparatus, the external service determination/instruction section 54 executes a control signal process corresponding to the control signal indicated by the control signal notice section 38.

The service information storage section 55 stores information utilized when the process associated with the input control signal is to be executed by the external service determination/instruction section 54. For example, the storage section 55 stores information in which the telephone terminal number is associated with the name of a registered, person relating to the control signal.

The process location rewrite instruct section 56 instructs, from the computer (12) side, a change of information stored in the process location storage section 34 of service process section 20. According to the operation of computer 12 by the user, the process location rewrite instruct section 56 causes the process location rewrite section 50 in service process section 20 to rewrite the content of information indicative of the location of execution of each control signal, which is stored in the process location storage section 34.

Two specific structures of the process location determination section 32 will now be described.

FIG. 3 shows the process location determination section 32 with a first structure. The process location determination section 32 shown in FIG. 3 is provided with a function of a synthetic determination section 32a and a function of a service type determination section 32b. The synthetic determination section 32a finally determines the process location of the control signal on the basis of process location determination by the internal signal frame preparation section 52 and process location determination by the service type determination section 32b. The service type determination section 32b determines the type of service associated with the input control signal.

The process location storage section 34, as shown in FIG. 3, is provided with a default process location storage section 34a and a service-related process location storage section 34b. The default process location storage section 34a prestores information indicating whether a default process location is set within the exchange or at an external processing apparatus in a case where a process location corresponding the incoming control signal is not defined. The service-related process location storage section 34b stores information indicating whether the process associated with the control signal for each service type is executed in the exchange or in the external processing apparatus. The information stored in the service-related process location storage section 34b is freely rewritten by the process location rewrite section 50.

FIG. 4 shows examples of information stored in the So service-related process location storage section 34b. As is shown in FIG. 4, the service-related process location storage section 34b stores, in an associated manner, information on various services and information on process locations (inside or outside) corresponding to the services. For example, the control signal for message waiting (MW) is processed externally, i.e. in the external service determination/instruction section 54 in the computer 12.

FIG. 5 shows the process location determination section 32 with a second structure. The process location determination section 32 shown in FIG. 5 is provided with a function of a synthetic determination section 32c and a function of an arrival-time determination section 32d. The synthetic determination section 32c finally determines the process location of the control signal on the basis of process location determination by the internal signal frame preparation section 52 and process location determination by the arrival-time determination section 32d. The arrival-time determination section 32d determines the arrival time of the input control signal.

The process location storage section 34, as shown in FIG. 5, is provided with a default process location storage section 34a and an arrival-time-related process location storage section (time-zone-related process location storage means) 34c. The default process location storage section 34a prestores information indicating whether a default process location is set within the exchange or at an external processing apparatus in a case where a process location corresponding the incoming control signal is not defined. The arrival-time-related process location storage section 34c stores information indicting the location of execution of the control signal in each time zone. The information stored in the arrival-time-related process location storage section 34c can be freely rewritten by the process location rewrite section 50.

FIG. 6 shows examples of information stored in the arrival-time-related process location storage section 34c. As is shown in FIG. 6, the arrival-time-related process location storage section 34c stores, in an associated manner, information on time zones and information on process locations (inside or outside) corresponding to the respective time zones. For example, a control signal, which has arrived at "19:00" included in time zone "17:00–0:00", is processed externally, i.e. in the external service determination/instruction section 54 in the computer 12.

Figure 7:
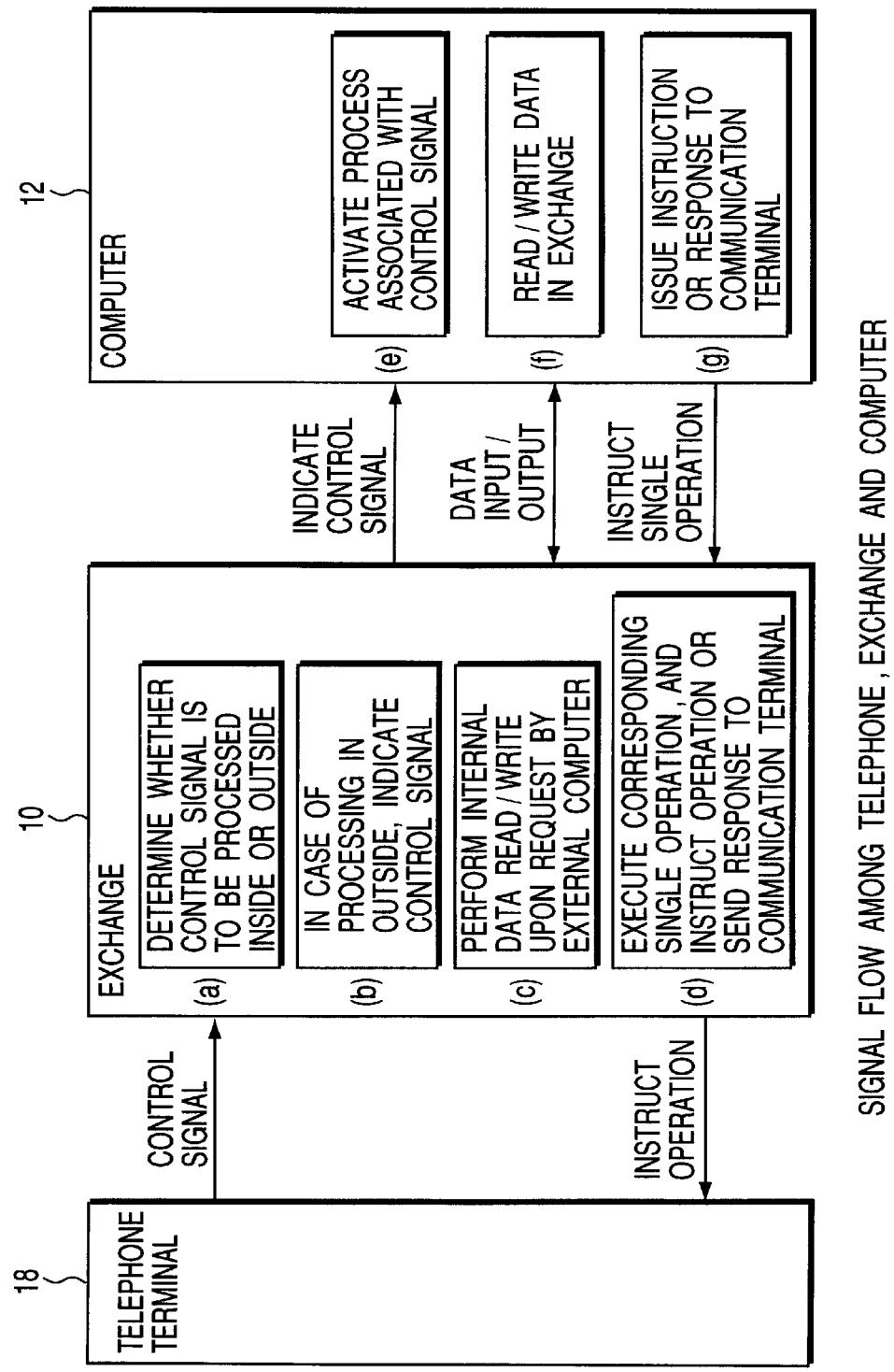
FIG. 7 shows a flow of signals among a telephone terminal 18, an exchange 10 and a computer 12, thereby to describe the outline of the operation of the embodiment.

The outline of the operation of the present embodiment will now be described with reference to FIG. 7 showing the flow of signals between a telephone terminal 18, an exchange 10 and a computer 12.

If a specific number is input by depressing a one-touch key (not shown) or a dial key (not shown) at the telephone terminal 18, a control signal is generated. The control signal is input to the terminal line control section 24 of the control circuit 10a through the various-line trunk circuit 10d.

The internal signal frame preparation section 52 of terminal line control section 24 generates an internal signal frame of a format shown in, e.g. FIG. 8, in order to notify the service process section 20 of arrival of the control signal. The internal signal frame of FIG. 8 comprises notice content data for indicating the content of a control signal, information (number of telephone terminal 18) on an origin of a control signal request, etc., and a flag provided with a mark indicating whether the control signal is to be executed within the exchange or in the external processing apparatus.

In this case, the internal signal frame preparation section 52 determines whether an input control signal is to be processed within the exchange or in the external processing apparatus, in accordance with the content of the control signal. Based on the determination result, a mark is added to the internal signal frame, and the resultant internal signal frame is output to the process location determination section 32. In this embodiment, the flag is set to indicate that the control signal is processed by the external processing apparatus.

The determination in this case is performed by selectively using three methods: 1) a first method corresponding to the case where a specific number indicating that a service is processed by the computer 12 has been input by the user, 2) a second method corresponding to the case where the port connected to the communication line, through which a control signal has been sent, is a special one, or 3) the communication line through which the control signal has been sent belongs to a specific group.

In the first method in which the specific number is input by the user, if the internal signal frame preparation section 52 has recognized the specific number by dial analysis, it determines that a request has been made to process the control signal in the external computer 12. Then, a flag indicating that the process location of the control signal is at the external processing apparatus is added to the flag portion of the internal signal frame ("flag-on"), and thus the internal signal frame is generated.

With the first method, where the user requires a process by the computer 12, for example, where a high-level process, which is not pre-provided in the service process section 20, is to be executed, the user intentionally designates the specific number, thereby to enjoy high-level services carried out by the computer 12.

Even if the user is not informed of the presence of the computer 12, if the user is merely informed that he/she should designate the specific number to enjoy specific services, the user can enjoy such services without noticing the presence of computer 12.

In the second method in which the control signal comes from the special port, the internal signal frame preparation section 52 refers to the information (port number table 53a) stored in the control signal determination information storage section 53, and determines whether the signal received from the outside is that from the special port and the signal needs to be processed by the external computer 12.

FIG. 9 shows an example of the port number table 53a stored in the control signal determination information storage section 53. The port number table 53a shown in FIG. 9 stores, in an associated manner, information on the port numbers of respective ports, from which the terminal line control section 24 can receive the signals, and information on process locations corresponding to the port numbers.

For example, where the control signal has been sent from the line connected to a port with port number "003", the internal signal frame preparation section 52 refers to the port number table 53a and determines that the control signal needs to be processed by the external processing apparatus. Then, a flag indicating that the process location of the control signal is at the external processing apparatus is added to the flag portion of the internal signal frame ("flag-on"), and thus the internal signal frame is generated. In the second method, with use of the telephone terminal 18 connected to the specific port, the computer 12 is caused to execute the process corresponding to the control signal.

In the third method, where the control signal is sent from the telephone terminal (or communication line) 18 belonging to a specific group, the internal signal frame preparation section 52 refers to information (terminal attribute table 53b, group table 53c) stored in the control signal determination information storage section 53, and determines whether the telephone terminal 18, from which the control signal has been sent, belongs to the specific group and the process needs to be executed in the external computer 12.

FIGS. 10A and 10B show examples of terminal attribute table 53b (FIG. 10A) and group table 53c (FIG. 10B) stored in the control signal determination information storage section 53.

The terminal attribute table 53b shown in FIG. 10A stores information indicative of various attributes relating to the terminal which sends the control signal to the terminal line control section 24 and such information includes information on the group to which the terminal belongs. FIG. 10A shows attribute information relating to one terminal (telephone terminal 18). Attribute information indicating that the terminal belongs to "extension group A" is registered.

The group table 53c of FIG. 10B stores, in an associated manner, information on the groups and information on the corresponding process locations.

For example, where a control signal has been input from the terminal belong to "extension group A", the internal signal frame preparation section 52 refers to the group table 53c and determines that the control signal needs to be processed by the external processing apparatus. Then, a flag indicating that the process location of the control signal is at the external processing apparatus is added to the flag portion of the internal signal frame ("flag-on"), and thus the internal signal frame is generated.

With the third method, customized services can be presented to a specific group, and services prepared in the computer 12 can be enjoyed in units of a group.

If the internal signal frame is thus generated by the internal signal frame preparation section 52, it is output to the process location determination section 32. The process location determination section 32 refers to the internal signal frame and determines whether the process associated with the control signal, which is indicated by the notice content data, is to be executed within the exchange or in the external apparatus (computer 12) (step (a) in FIG. 7).

For example, the process location determination section 32 with the structure shown in FIG. 3 (i.e. the first structure) operates, as will be described below.

The service type determination section 32b determines the type of service corresponding to the received control signal, from the notice content data of the internal signal frame. Based on the service type, the service type determination section 32b determines whether the process for providing the service associated with the control signal is to be executed internally (i.e. in the internal service determination/instruction section 36) or externally (i.e. in the external service determination/instruction section 54 of computer 12).

If the service type determination section 32b fails to determine the process location by referring to the service-related process location storage section 34b, that is, if the process location corresponding to the input control signal is not defined, the service type determination section 32b refers to the default process location storage section 34a and determines that the default process location of the system is the location of execution of the process for providing the service.

Then the synthetic determination section 32a finally determines the process location of the control signal, on the basis of the process location determination by the internal signal frame preparation section 52 and the process location determination by the service type determination section 32b. Specifically, the synthetic determination section 32a compares the process location indicated by the flag of the internal signal frame and the process location determined by the service type determination section 32b, and if both are identical, it determines the matched process location to be the process location. If not, it determines the process location according to a predetermined order of priority. For example, in the case where it is predetermined that the determination by the internal signal frame preparation section 52 has a priority, if the flag is set in the internal signal frame to indicate the processing by the external apparatus and the determination by the service type determination section 32b indicates the processing within the exchange, the process location is determined to be the external apparatus. The order of priority may be altered, depending on the situation.

Where the process location determination section 32 is constructed, as shown in FIG. 5 (the second structure), the operation is as follows.

The arrival-time determination section 32*d* refers to the arrival-time-related process location storage section 34*c* on the basis of the time at which the control signal was received, thereby determining whether the process for providing the service associated with the input control signal is to be performed inside (in the internal service determination/instruction section 36) or outside (in the external service determination/instruction section 54 in the computer 12).

The arrival-time determination section 32*d* fails to determine the process location by referring to the arrival-time-related process location storage section 34*c*, that is, if the process location associated with the reception time zone of the control signal is not defined, the arrival-time determination section 32*d* refers to the default process location storage section 34*a* and determines that the default process location of the system is the location of execution of the process for providing the service.

Then the synthetic determination section 32*c* finally determines the process location of the control signal, on the basis of the process location determination by the internal signal frame preparation section 52 and the process location determination by the arrival-time determination section 32*d*. Specifically, the synthetic determination section 32*c* compares the process location indicated by the flag of the internal signal frame and the process location determined by the arrival-time determination section 32*d*, and if both are identical, it determines the matched process location to be the process location. If not, it determines the process location according to a predetermined order of priority. For example, in the case where it is predetermined that the process by the external apparatus has a priority over the process within the exchange, if the flag is set in the internal signal frame to indicate the processing by the external apparatus and the determination by the arrival-time determination section 32*d* indicates the processing within the exchange, the process location is determined to be the external apparatus.

If the process location determination section 32 has determined that the process location is within the exchange, it notifies the internal service determination/instruction section 36 of the content of the input control signal and request execution of the process. The internal service determination/instruction section 36, while referring to the data stored in the data storage section 44 on an as-needed basis, executes the process associated with the input control signal and sends an operational instruction or a response signal to the communication line via the terminal operation instruct section 48.

On the other hand, if the process location determination section 32 has determined that the process location is at the external processing apparatus, it notifies, via the control signal notice section 38, the external service determination/instruction section 54 in the computer 12 of the content of the input control signal, and requests execution of the process ((b) in FIG. 7).

The external service determination/instruction section 54 activates the process associated with the input control signal ((e) in FIG. 7) and, while referring to the data stored in the service information storage section 55 on an as-needed basis, executes the process associated with the input control signal. In addition, if read/write of data stored in the data storage section 44 in the exchange 10 is needed ((f) in FIG. 7), the external service determination/instruction section 54 requests input/output of data to the data interface section 42 in the service process section 20.

In response to the request from the external service determination/instruction section 54, the data interface section 42 executes data read/write from and to the data storage section 44 ((c) in FIG. 7).

If a need arises to send an instruction or a response to the communication line such as telephone line 18 after the process associated with the control signal has been executed, the external service determination/instruction section 54 instructs the external instruction receive section 46 of exchange 10 to execute a functional operation corresponding to the process result ((g) in FIG. 7).

The external instruction receive section 46 of exchange 10 executes a predetermined function in accordance with the instruction from the external service determination/instruction section 54. Thereby, with use of the same instruction as used in the internal service determination/instruction section 36, the external instruction receive section 46 sends the operational instruction or response signal to the communication line via the terminal operation instruct section 48 ((d) in FIG. 7).

Accordingly, in response to the control signal input to the exchange 10, the process associated with the control signal can be performed not only by the internal service determination/instruction section 36 pre-provided in the exchange but also by the external service determination/instruction section 54 provided in the computer 12.

The computer 12 can be freely managed by the user. For example, if an exchange process program capable of providing high-level services associated with the input control signal is provided, the external service determination/instruction section 54 can execute processes based on the exchange process program. Accordingly, the user's requests for alteration of process contents can be easily complied with.

Figure 11:
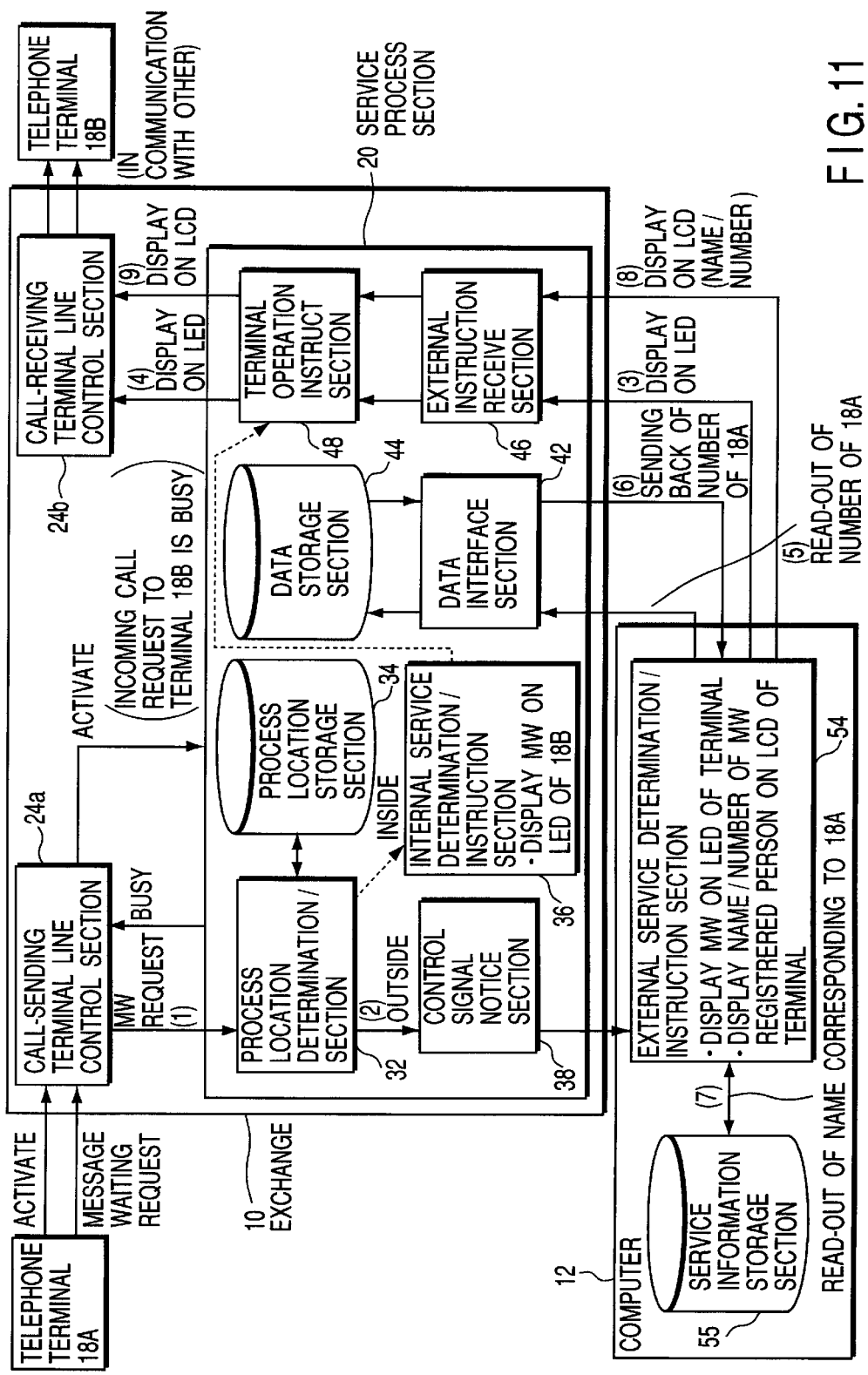
FIG. 11 is a view for describing an operation in a case where a message waiting request has been input.

An example of the specific operation when the control signal has been input will now be described by referring to the case where a message waiting (MW) request has been made. FIG. 11 is a view for describing the operation when the message waiting request has been input. FIG. 11 shows only such structural elements as are necessary for describing a series of operations.

When a call-reception request is made from a terminal 18A to a terminal 18B, the service process section 20 is notified of an activation request through a call-sending terminal line control section 24*a* (terminal line control section 24). At this time, if the terminal 18B is being connected to another terminal, etc. and the call-reception is not accepted, a "busy" response is sent from the service process section 20 to the terminal 18A. In response to the "busy" response, it is assumed that a message waiting (MW) request has been issued from the terminal 18A to the exchange 10. The call-sending terminal line control section 24*a* and a call-receiving terminal line control section 24*b* are realized by the various-line trunk circuit 10*d*.

The call-sending terminal line control section 24*a* generates an internal signal frame, according to the above-described method, with respect to the message request input from the terminal 18A, and notifies the process location determination section 32 of the message request ((1) in FIG. 11).

Based on the internal signal frame from the call-sending terminal line control section 24*a*, the process location determination section 32 determines whether the process associated with the MW request is to be performed within the exchange or at the external processing apparatus.

For example, where the process is to be performed according to the exchange process program (internal message waiting process program) pre-provided in the exchange 10, that is, where the process is to be executed by the internal service determination/instruction section 36, such a service can be provided that a message waiting display for indicating the call-reception request is made on a display (e.g. LED) provided on the call-receiving terminal 18B.

Assume that the process associated with the input MW request is executed in the apparatus external to the exchange 10. The process location determination section 32 notifies, via the control signal notice section 38, the external service determination/instruction section 54 in the computer 12 of the input MW request ((2) in FIG. 11).

For example, where the process associated with the user's request is to be performed according to the exchange process program (external computer message waiting process program) provided in the computer 12, that is, where the process is to be executed by the external service determination/instruction section 54, such a service can be provided that a message waiting display for indicating the call-reception request is made on a display (e.g. LED) provided on the call-receiving terminal 18B and also the name and telephone number of the message waiting registrant are displayed on the display (e.g. LCD) of the call-receiving terminal 18B.

At first, in response to the message waiting request, the external service determination/instruction section 54 instructs, via the external instruction receive section 46 and terminal operation instruct section 48 in the exchange 10, the call-receiving terminal line control section 24b (terminal line control section 24) to effect the message waiting display for indicating the call-reception request on the LED provided on the terminal 18B ((3) and (4) in FIG. 11). This instruction is sent from the call-receiving terminal line control section 24b to the terminal 18B.

The external service determination/instruction section 54 requests the data interface section 42 to read out the telephone number of the terminal 18A from which the message waiting request has been issued ((5) in FIG. 11). In response to the request from the external service determination/ instruction section 54, the data interface section 42 acquires the associated telephone number from the data storage section 44 and sends it back to the external service determination/instruction section 54 ((6) in FIG. 11).

On the basis of the telephone number of the terminal 18A acquired from the exchange 10, the external service determination/instruction section 54 reads out the name corresponding to the telephone number of terminal 18A from the service information storage section 55 ((7) in FIG. 11). The service information storage section 55 stores, in an associated manner, information on the telephone numbers of the terminals and information on the corresponding names. Assume that such information was prepared as necessary processing data, for example, at the same time the program (external computer message waiting process program) associated with the message waiting request for computer 12 was prepared.

Having acquired the name corresponding to the telephone number of the terminal 18A from the service information storage section 55, the external service determination/ instruction section 54 instructs, via the external instruction receive section 46 and terminal operation instruct section 48 in the exchange 10, the call-receiving terminal line control section 24b to display the name and telephone number of the terminal 18A, from which the call reception has been requested, on the LCD provided on the terminal 18B ((8) and (9) in FIG. 11). This instruction is sent from the call-receiving terminal line control section 24b to the terminal 18B.

Accordingly, the presence of the message waiting request can be recognized from the LED display on the terminal 18B. In addition, the telephone number and name of the terminal which issued the call-receiving request can be recognized from the LCD display.

In the prior art, there is no choice but to process the message waiting request in the internal service determination/instruction section pre-provided in the service process section. On the other hand, according to the present invention, the message waiting request is sent to the computer 12 so that it may be processed by the external service determination/instruction section 54. Since the external service determination/instruction section 54 can be prepared in accordance with the user's request for change of services, it can provide the message waiting display service as well as such high-level services for displaying the telephone number and name of the terminal 18A on the terminal 18B, as described above, which cannot be provided by the internal service determination/instruction section 36.

In the above embodiment, the number of external processing apparatuses is one. However, two or more external processing apparatuses may be provided so as to perform individual processing on the basis of the specific number, service type and arrival-time.

In the above-described techniques of the present embodiment, the programs to be executed by the computer may be stored in, e.g. magnetic disks (floppy disks, hard disks, etc.), optical disks (CD-ROMs, DVDs, etc.) or semiconductor memories and can be provided to various apparatuses. Moreover, the programs may be provided to various apparatuses by transmission through communication media. The computer, which realizes the present apparatus, executes the above-described processes by reading programs stored in recording media or receiving programs via communication media, and having its operations controlled by these programs.

As has been described above in detail, according to the present invention, services are provided by notifying the external computer of the control signal sent from the communication line and causing the computer to execute associated processes. In this case, since the data read/write within the exchange can be effected from the external computer, the processes can be flexibly performed to provide services. Therefore, the user's requests for change of services can be complied with quickly and flexibly, the services can be altered directly by the user, and the exchange services can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exchange apparatus for providing a service relating to telephone exchange in accordance with a control signal received from a communication line, the exchange apparatus comprising:

control signal receiving means for receiving the control signal from the communication line;

process location determination means for determining whether a process associated with the control signal received by the control signal receiving means is to be executed within the exchange apparatus or in a processing apparatus external to the exchange apparatus;

control signal notice means for notifying the processing apparatus external to the exchange apparatus of a content of the received control signal, when the process location determination means has determined that the process is to be executed in the external processing apparatus; and service providing means for providing a service, on the basis of a result of the process executed by the external processing apparatus in accordance with the content of the control signal, of which the external processing apparatus was notified by the control signal notice means.

2. An exchange apparatus according to claim 1, further comprising data storage means for storing various data to be used when the process associated with the received control signal is executed.

3. An exchange apparatus according to claim 2, further comprising data interface means for outputting the data stored in the data storage means to the processing apparatus external to the exchange apparatus, in accordance with a request arising from the process, of which the external processing apparatus was notified by the control signal notice means and which was executed by the external processing apparatus in accordance with the content of the control signal.

4. An exchange apparatus according to claim 1, wherein the service providing means includes instruction transmission means for transmitting an instruction to the communication line or another communication line.

5. An exchange apparatus according to claim 4, wherein the instruction transmission means transmits an instruction to the communication line or another communication line, with use of the same instruction as in the case where the process is executed within the exchange apparatus, on the basis of a result of the process executed by the processing apparatus external to the exchange apparatus.

6. An exchange apparatus according to claim 1, further comprising process location storage means for storing information as to whether the process associated with the received control signal is to be executed within the exchange apparatus or in the external processing apparatus, wherein the process location determination means effects the determination on the basis of the information stored in the process location storage means.

7. An exchange apparatus according to claim 6, further comprising process location rewrite means for rewriting the information stored in the process location storage means.

8. An exchange apparatus according to claim 6, wherein the process location storage means includes service-related process location storage means for storing data on a location of execution of the process associated with the control signal in accordance with a type of service, and the process location determination means includes service type determination means for determining the service type corresponding to the received control signal and acquires data on the location of execution from the service-related process location storage means on the basis of the service type corresponding to the received control signal.

9. An exchange apparatus according to claim 6, wherein the process location storage means includes arrival-time-related process location storage means for storing data on a location of execution of the process associated with the control signal in accordance with a time zone, and the process location determination means includes control-signal arrival time determination means for determining an arrival time of the received control signal and acquires data on the location of execution from the arrival-time-related process location storage means on the basis of the arrival time of the received control signal.

10. An exchange apparatus according to claim 1, further comprising internal signal frame preparation means for preparing an internal signal frame on the basis of the control signal sent from the communication line, wherein the internal signal frame includes a flag indicative of a location of execution of the process associated with the control signal and information indicative of the content of the control signal, and the process location determination means determines the location of execution of the process associated with the control signal on the basis of the flag.

11. An exchange apparatus according to claim 10, wherein the internal signal frame preparation means sets the flag indicating that the process associated with the control signal is to be executed in the processing apparatus external to the exchange apparatus, when the control signal, in which a specific number indicating the execution of the process in the external processing apparatus is designated, has been input.

12. An exchange apparatus according to claim 10, wherein the internal signal frame preparation means sets the flag indicating that the process associated with the control signal is to be executed in the processing apparatus external to the exchange apparatus, when a port connected to the communication line through which the control signal has been sent is a special one.

13. An exchange apparatus according to claim 10, wherein the internal signal frame preparation means sets the flag indicating that the process associated with the control signal is to be executed in the processing apparatus external to the exchange apparatus, when the communication line through which the control signal has been sent belongs to a specific group.

14. An exchange apparatus according to claim 1, further comprising process location storage means for storing information as to whether the process associated with the received control signal is to be executed within the exchange apparatus or in the external processing apparatus, and internal signal frame preparation means for preparing an internal signal frame on the basis of the control signal sent from the communication line, wherein the internal signal frame includes a flag indicative of a location of execution of the process associated with the control signal and information indicative of the content of the control signal, and the process location determination means effects the determination on the basis of the information stored in the process location storage means and the flag.

15. An exchange apparatus according to claim 14, wherein the process location determination means determines the location of execution of the process on the basis of determination based on the information stored in the process location storage means, determination based on the flag, and a predetermined order of priority of determination.

16. An exchange apparatus according to claim 15, wherein the predetermined order of priority of determination is defined to give a priority to the determination based on the information stored in the process location storage means.

17. An exchange apparatus according to claim 15, wherein the predetermined order of priority of determination is defined to give a priority to the determination based on the flag.

18. An exchange apparatus according to claim 15, wherein the predetermined order of priority of determination is defined to give a priority to the execution of the process by the external processing apparatus.

19. An exchange apparatus according to claim 1, further comprising second service providing means for providing a service on the basis of a result of the process executed in accordance with the content of the control signal, where the process location determination means has determined that the process is to be executed within the exchange apparatus.

20. A telephone exchange system comprising a telephone exchange apparatus for performing an operation relating to telephone exchange in accordance with a control signal received from a communication line, and an external processing apparatus for performing a process associated with the control signal from the communication line, of which the telephone exchange apparatus notifies the external processing apparatus, the telephone exchange apparatus comprising:

control signal receiving means for receiving the control signal from the communication line;

process location determination means for determining whether the process associated with the control signal received by the control signal receiving means is to be executed in the external processing apparatus;

control signal notice means for notifying the external processing apparatus of a content of the received control signal, when the process location determination means has determined that the process is to be executed in the external processing apparatus; and means for performing the operation relating to the telephone exchange, on the basis of a result of the process executed by the external processing apparatus in accordance with the content of the control signal, of which the external processing apparatus was notified by the control signal notice means, and the external processing apparatus comprising:

external service process means for performing the process based on the content of the control signal, of which the external service process means has been notified by the control signal notice means.

21. A telephone exchange system according to claim 20, further comprising data storage means for storing various data to be used when the process associated with the received control signal is executed.

22. A telephone exchange system according to claim 21, wherein the external service process means includes data request means for requesting necessary data for the process based on the content of the control signal from the telephone exchange apparatus, and the telephone exchange apparatus further comprises data interface means for outputting to the data request means the data stored in the data storage means in response to a request by the data request means.

23. A telephone exchange system according to claim 20, wherein the telephone exchange apparatus further includes process location storage means for storing information as to whether the process associated with the received control signal is to be executed within the telephone exchange apparatus or in the external processing apparatus, and process location rewrite means for rewriting the information stored in the process location storage means, and the external service process means includes process location rewrite instruct means for instructing the process location rewrite means to rewrite data on the process location.

24. A telephone exchange system comprising a telephone exchange apparatus for performing an operation relating to telephone exchange in accordance with a control signal received from a communication line, and an external processing apparatus for performing a process associated with the control signal, the system comprising:

control signal receiving means for receiving the control signal from the communication line;

process location determination means for determining whether the process associated with the control signal received by the control signal receiving means is to be executed within the exchange apparatus or in the external processing apparatus;

process execution means, provided in the external processing apparatus, for executing the process in accordance with the control signal, when the process location determination means has determined that the process is to be executed by the external processing apparatus; and operation means, provided in the exchange apparatus, for performing the operation relating to the telephone exchange on the basis of a result of the process executed by the process execution means.

25. A telephone exchange system according to claim 24, further comprising data storage means for storing various data to be used when the process associated with the received control signal is executed.

26. A telephone exchange system according to claim 25, wherein the process execution means includes data request means for requesting necessary data for the process based on the content of the control signal, and the telephone exchange system further comprises data interface means for outputting to the data request means the data stored in the data storage means in response to a request by the data request means.

27. A telephone exchange system according to claim 24, further comprising process location storage means for storing information as to whether the process associated with the received control signal is to be executed within the exchange apparatus or in the external processing apparatus, and process location rewrite means for rewriting the information stored in the process location storage means, and the process execution means includes process location rewrite instruct means for instructing the process location rewrite means to rewrite data on the process location.

28. A telephone exchange system comprising a telephone exchange apparatus for performing an operation relating to telephone exchange in accordance with a control signal received from a communication line, and an external processing apparatus for performing a process associated with the control signal, the system comprising:

control signal receiving means for receiving the control signal from the communication line;

process location determination means for determining whether the process associated with the control signal received by the control signal receiving means is to be executed within the exchange apparatus or in the external processing apparatus;

process execution means, provided in the exchange apparatus, for executing the process in accordance with the control signal, when the process location determination means has determined that the process is to be executed within the exchange apparatus; and operation means, provided in the exchange apparatus, for performing the operation relating to the telephone exchange on the basis of a result of the process executed by the process execution means.

29. A telephone exchange system according to claim 28, further comprising data storage means for storing various data to be used when the process associated with the received control signal is executed.

30. A telephone exchange system according to claim 28, further comprising process location storage means for storing information as to whether the process associated with the received control signal is to be executed within the exchange apparatus or in the external processing apparatus, and process location rewrite means for rewriting the information stored in the process location storage means.

31. A telephone exchange system comprising a telephone exchange apparatus for performing an operation relating to telephone exchange in accordance with a control signal received from a communication line, and an external processing apparatus for performing a process associated with the control signal, the system comprising:

control signal receiving means for receiving the control signal from the communication line;

determination means for determining whether the process associated with the control signal received by the control signal receiving means is to be executed in the external processing apparatus;

process execution means, provided in the external processing apparatus, for executing the process in accordance with the control signal, when the determination means has determined that the process is to be executed by the external processing apparatus; and operation means, provided in the exchange apparatus, for performing the operation relating to the telephone exchange on the basis of a result of the process executed by the process execution means.

32. A telephone exchange system according to claim 31, further comprising data storage means for storing various data to be used when the process associated with the received control signal is executed.

33. A telephone exchange system according to claim 32, wherein the process execution means includes data request means for requesting necessary data for the process based on the content of the control signal, and the telephone exchange system further comprises data interface means for outputting to the data request means the data stored in the data storage means in response to a request by the data request means.

34. A telephone exchange system according to claim 31, further comprising process location storage means for storing information as to whether the process associated with the received control signal is to be executed within the exchange apparatus or in the external processing apparatus, and process location rewrite means for rewriting the information stored in the process location storage means, and the process execution means includes process location rewrite instruct means for instructing the process location rewrite means to rewrite data on the process location.

35. An exchange apparatus for use in a telephone exchange system comprising an exchange apparatus for performing an operation relating to telephone exchange in accordance with a control signal received from a communication line, and an external processing apparatus including process execution means for performing a process associated with the control signal, the exchange apparatus comprising:

control signal receiving means for receiving the control signal from the communication line;

process location determination means for determining whether the process associated with the control signal received by the control signal receiving means is to be executed within the exchange apparatus or in the external processing apparatus; and operation means for performing the operation relating to the telephone exchange on the basis of a result of the process executed by the process execution means.

36. An exchange apparatus for use in a telephone exchange system comprising an exchange apparatus for performing an operation relating to telephone exchange in accordance with a control signal received from a communication line, and an external processing apparatus for performing a process associated with the control signal, the exchange apparatus comprising:

control signal receiving means for receiving the control signal from the communication line;

process location determination means for determining whether the process associated with the control signal received by the control signal receiving means is to be executed within the exchange apparatus or in the external processing apparatus;

process execution means for executing the process in accordance with the control signal, when the process location determination means has determined that the process is to be executed within the exchange apparatus; and operation means for performing the operation relating to the telephone exchange on the basis of a result of the process executed by the process execution means.

37. An exchange apparatus for use in a telephone exchange system comprising an exchange apparatus for performing an operation relating to telephone exchange in accordance with a control signal received from a communication line, and an external processing apparatus including process execution means for performing a process associated with the control signal, the exchange apparatus comprising:

control signal receiving means for receiving the control signal from the communication line;

process location determination means for determining whether the process associated with the control signal received by the control signal receiving means is to be executed in the external processing apparatus; and operation means for performing the operation relating to the telephone exchange on the basis of a result of the process executed by the process execution means.

* * * * *